US010591853B2

(12) United States Patent
Tomita et al.

(10) Patent No.: US 10,591,853 B2
(45) Date of Patent: Mar. 17, 2020

(54) MOVING DEVICE AND IMAGE FORMING APPARATUS INCORPORATING THE MOVING DEVICE

(71) Applicants: Kenji Tomita, Tokyo (JP); Kimihiro Tanaka, Kanagawa (JP); Yohei Miura, Tokyo (JP); Hiroaki Nieda, Kanagawa (JP)

(72) Inventors: Kenji Tomita, Tokyo (JP); Kimihiro Tanaka, Kanagawa (JP); Yohei Miura, Tokyo (JP); Hiroaki Nieda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 17 days.

(21) Appl. No.: 15/878,768

(22) Filed: Jan. 24, 2018

(65) Prior Publication Data
US 2018/0224779 A1    Aug. 9, 2018

(30) Foreign Application Priority Data

Feb. 3, 2017    (JP) .................................. 2017-018959

(51) Int. Cl.
*G03G 15/20*    (2006.01)
*H04N 1/00*    (2006.01)
*H04N 1/29*    (2006.01)

(52) U.S. Cl.
CPC ..... *G03G 15/2032* (2013.01); *H04N 1/00602* (2013.01); *H04N 1/29* (2013.01); *H04N 2201/0094* (2013.01)

(58) Field of Classification Search
CPC ................................................ G03G 15/2032
See application file for complete search history.

(56) References Cited

U.S. PATENT DOCUMENTS

| 5,983,062 A * | 11/1999 | Sameshima ........ G03G 15/1605 |
| | | 399/110 |
| 2004/0013452 A1* | 1/2004 | Choi .................. G03G 15/1605 |
| | | 399/313 |
| 2010/0166471 A1* | 7/2010 | Kikuchi ............. G03G 15/2028 |
| | | 399/331 |
| 2010/0232844 A1* | 9/2010 | Saito .................. G03G 15/1605 |
| | | 399/307 |

(Continued)

FOREIGN PATENT DOCUMENTS

JP    2014-089358    5/2014

OTHER PUBLICATIONS

LaBounty, David J., The Levers of American Striking Movements, Mar. 2001, as revised Oct. 2001.*

*Primary Examiner* — Sevan A Aydin
(74) *Attorney, Agent, or Firm* — Harness, Dickey & Pierce, P.L.C.

(57) ABSTRACT

A moving device, which is included in an image forming apparatus, includes a cam, a moving body, a biasing body, a drive source and a drive transmission device. The moving body is configured to be moved by the cam. The biasing body is configured to apply a biasing force to bias the moving body toward the cam. The drive source is configured to apply a driving force to the cam. The drive transmission device is configured to transmit the driving force to the cam and includes a load applying body configured to apply a load to a rotation of the cam.

8 Claims, 8 Drawing Sheets

(56) References Cited

U.S. PATENT DOCUMENTS

| | | | |
|---|---|---|---|
| 2010/0266307 A1* | 10/2010 | Kagawa | G03G 15/2035 399/70 |
| 2011/0293312 A1* | 12/2011 | Mimbu | G03G 15/1645 399/88 |
| 2013/0223901 A1* | 8/2013 | Minbe | G03G 15/163 399/310 |
| 2014/0270875 A1* | 9/2014 | Mimbu | B66F 19/00 399/329 |
| 2015/0309447 A1* | 10/2015 | Suzuki | G03G 15/1605 399/121 |
| 2017/0343937 A1 | 11/2017 | Tomita et al. | |

* cited by examiner

MOVING DEVICE AND IMAGE FORMING APPARATUS INCORPORATING THE MOVING DEVICE

CROSS-REFERENCE TO RELATED APPLICATION

This patent application is based on and claims priority pursuant to 35 U.S.C. § 119(a) to Japanese Patent Application No. 2017-018959, filed on Feb. 3, 2017, in the Japan Patent Office, the entire disclosure of which is hereby incorporated by reference herein.

BACKGROUND

Technical Field

This disclosure relates to a moving device and an image forming apparatus incorporating the moving device.

Related Art

Known moving devices include a cam, a moving member to be moved by the cam, a biasing member to bias the moving member toward the cam, and a drive transmission device that has a drive transmission member and that transmits a driving force of a drive source to the cam, so that the moving member is reciprocated.

A known moving device functions as a pressure adjustment mechanism to adjust a pressing force applied by a pressure roller to a fixing roller.

SUMMARY

At least one aspect of this disclosure provides a moving device including a cam, a moving body, a biasing body, a drive source, and a drive transmission device. The moving body is configured to be moved by the cam. The biasing body configured to apply a biasing force to bias the moving body toward the cam. The drive source is configured to apply a driving force to the cam. The drive transmission device configured to transmit the driving force to the cam and includes a load applying body configured to apply a load to a rotation of the cam.

Further, at least one aspect of this disclosure provides an image forming apparatus including a moving body and the above described moving device configured to move the moving body in a forward direction and a reverse direction.

BRIEF DESCRIPTION OF THE SEVERAL VIEWS OF THE DRAWINGS

An exemplary embodiment of this disclosure will be described in detail based on the following figured, wherein.

DETAILED DESCRIPTION

Figure 1:
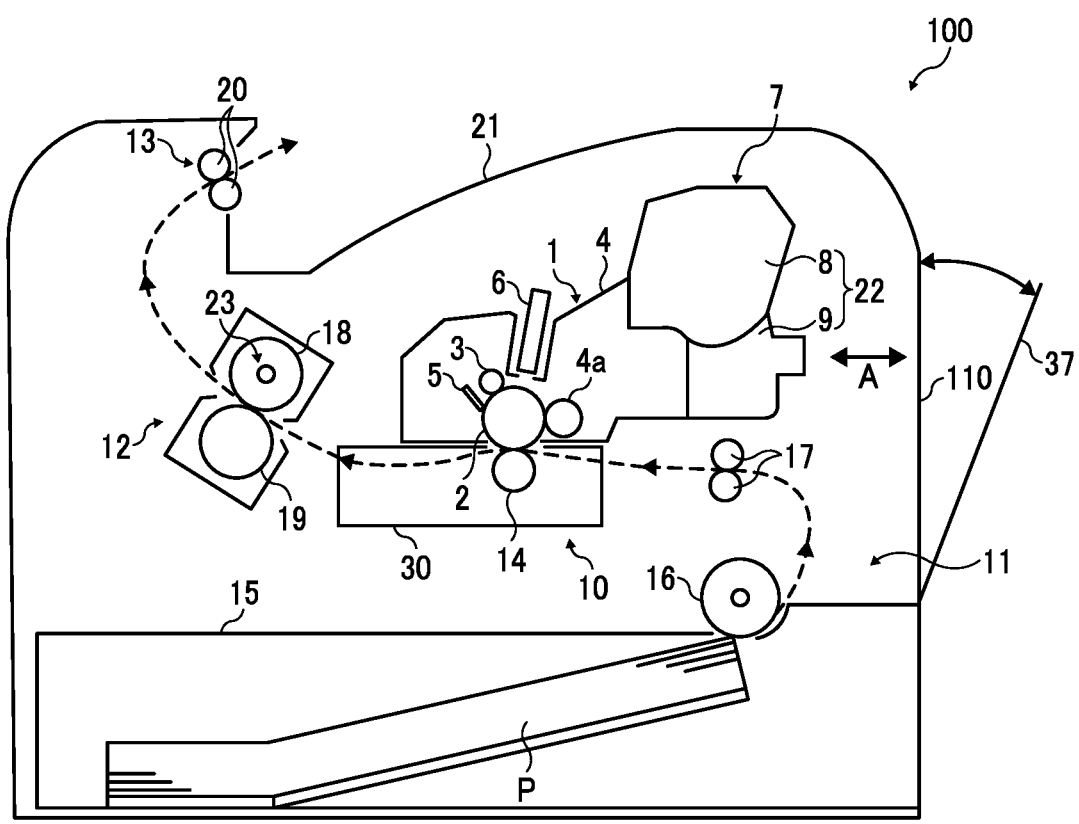
FIG. 1 is a schematic diagram illustrating an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Now, a description is given of an electrophotographic printer that functions as an electrophotographic image forming apparatus for forming images by electrophotography.

FIG. 1 is a schematic diagram illustrating an image forming apparatus 100 according to an embodiment of this disclosure.

The image forming apparatus 100 may be a copier, a facsimile machine, a printer, a multifunction peripheral or a multifunction printer (MFP) having at least one of copying, printing, scanning, facsimile, and plotter functions, or the like. According to the present example, the image forming apparatus 100 is an electrophotographic printer that prints toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

The image forming apparatus 100 according to the present embodiment of this disclosure, illustrated in FIG. 1, is a monochrome printer. The image forming apparatus 100 includes an apparatus body 110 and a process cartridge 1 that is disposed detachably attached in a direction indicated by arrow A in FIG. 1, relative to the apparatus body 110. The process cartridge 1 includes a photoconductor 2, a charging roller 3, a developing device 4, and a cleaning blade 5. The photoconductor 2 functions as an image bearer to bear an image on a surface thereof. The charging roller 3 functions as a charging device to uniformly charge the surface of the photoconductor 2. The developing device 4 includes a developing roller 4a that functions as a developing unit. The developing device 4 develops the image formed on the surface of the photoconductor 2 into a visible image. The cleaning blade 5 functions as a cleaning device to clean the surface of the photoconductor 2.

The image forming apparatus 100 further includes an LED (light emitting diode) head array 6 disposed near the photoconductor 2. The LED head array 6 functions as an exposing device to expose the surface of the photoconductor 2.

The process cartridge 1 includes a toner cartridge 7 that functions as a developer container. The toner cartridge 7 is detachably attached to the process cartridge 1.

The toner cartridge 7 includes a container body 22 in which a developer storing section 8 and a developer collecting section 9 are provided as a single unit. The developer storing section 8 accommodates toner that functions as developer to be supplied to the developing device 4.

The developer collecting section 9 collects toner (used toner or waste toner) that has been removed by the cleaning blade 5.

The image forming apparatus 100 further includes a transfer device 10, a sheet feeding device 11, a fixing device 12, and a sheet discharging device 13. The transfer device 10 transfers the image formed on the surface of the photoconductor 2 onto a sheet P such as a transfer medium. The sheet feeding device 11 supplies and feeds the sheet P toward the transfer device 10. The fixing device 12 fixes the image transferred onto the sheet P to the sheet P. The sheet discharging device 13 outputs the sheet P outside the apparatus body 110 of the image forming apparatus 100.

The transfer device 10 includes a transfer roller 14. The transfer roller 14 functions as a transfer body rotatably disposed to a transfer frame 30.

The transfer roller 14 is in contact with the photoconductor 2 in a state in which the process cartridge 1 is attached to the apparatus body 110 of the image forming apparatus 100. A transfer nip region is formed at a contact portion at which the photoconductor 2 and the transfer roller 14 contact to each other.

In addition, the transfer roller 14 is connected to a power source, and a predetermined direct current (DC) voltage and/or an alternating current (AC) voltage are supplied to the transfer roller 14.

The sheet feeding device 11 includes a sheet feed tray 15 and a sheet feed roller 16. The sheet feed tray 15 contains the sheet P. The sheet feed roller 16 feeds the sheet P contained in the sheet feed tray 15. Further, a pair of registration rollers 17 is disposed downstream from the sheet feed roller 16 in a sheet conveying direction. The pair of registration rollers 17 functions as a pair of timing rollers to convey the sheet P to the transfer nip region at a proper timing of conveyance of the sheet P.

It is to be noted that the sheet P is not limited to the above-described transfer medium but also includes thick paper, post card, envelope, plain paper, thin paper, coated paper, art paper, tracing paper, and the like. The sheet P further includes a non-paper material such as OHP sheet, OHP film, and any other sheet-shaped material on which an image can be formed.

The fixing device 12 includes a fixing roller 18 and a pressure roller 19. The fixing roller 18 is heated by an infrared heater 23 that is disposed inside the fixing roller 18. The pressure roller 19 has a rotary shaft 19a and is pressed toward the fixing roller 18 to contact the fixing roller 18. A fixing nip region is formed at a position where the fixing roller 18 and the pressure roller 19 contact with each other.

The sheet discharging device 13 includes a pair of sheet ejecting rollers 20. After having been ejected to the outside of the apparatus body 110 of the image forming apparatus 100 by the pair of sheet ejecting rollers 20, the sheet P is loaded on a sheet output tray 21 that has a concaved shape or a downwardly curved shape on an upper face of the apparatus body 110 of the image forming apparatus 100.

Next, a description is given of basic functions of the image forming apparatus 100 according to the present embodiment of this disclosure, with reference to FIG. 1.

When an image forming operation is started, the photoconductor 2 of the process cartridge 1 is rotated in a clockwise direction in FIG. 1, and the charging roller 3 uniformly charges the surface of the photoconductor 2 with a predetermined polarity. The LED head array 6 emits a light beam onto the charged face of the photoconductor 2 based on image data input from an external device, so that an electrostatic latent image is formed on the surface of the photoconductor 2.

The developing device 4 supplies toner onto the electrostatic latent image formed on the photoconductor 2, thereby developing (visualizing) the electrostatic latent image into a visible image as a toner image.

Further, as the image forming operation is started, the transfer roller 14 is rotated and a predetermined direct current (DC) and/or the alternating current (AC) are supplied to the transfer roller 14. As a result, a transfer electric field is formed between the transfer roller 14 and the opposing photoconductor 2.

By contrast, the sheet feed roller 16 that is disposed in a lower portion of the apparatus body 110 of the image forming apparatus 100 is driven and rotated to feed the sheet P from the sheet feed tray 15. Conveyance of the sheet P fed from the sheet feed tray 15 is temporarily interrupted by the pair of registration rollers 17.

Thereafter, at the predetermined timing, the pair of registration rollers 17 starts rotating again. Then, in synchronization with movement of the toner image formed on the surface of the photoconductor 2 reaching the transfer nip region, the sheet P is conveyed to the transfer nip region. Due to the transfer electric field, the toner image formed on the surface of the photoconductor 2 is collectively transferred onto the sheet P. After transfer of the toner image from the photoconductor 2 onto the sheet P, the cleaning blade 5 removes residual toner, which is failed to be transferred onto the sheet P and therefore remains on the surface of the photoconductor 2, from the surface of the photoconductor 2. The removed toner is conveyed and collected into the developer collecting section 9 of the container body 22.

Thereafter, the sheet P having the toner image thereon is conveyed to the fixing device 12, where the toner image is fixed to the sheet P. Then, the sheet P is ejected by the pair of sheet ejecting rollers 20 to the outside of the apparatus body 110 of the image forming apparatus 100 and is stocked onto the sheet output tray 21.

The image forming apparatus 100 further includes a cover 37 on a side face (the right side face in FIG. 1) of the apparatus body 110. The cover 37 opens and closes in a direction indicated by arrow in FIG. 1. By opening the cover 37, the process cartridge 1 can be removed from the apparatus body 110 of the image forming apparatus 100.

Figure 2:
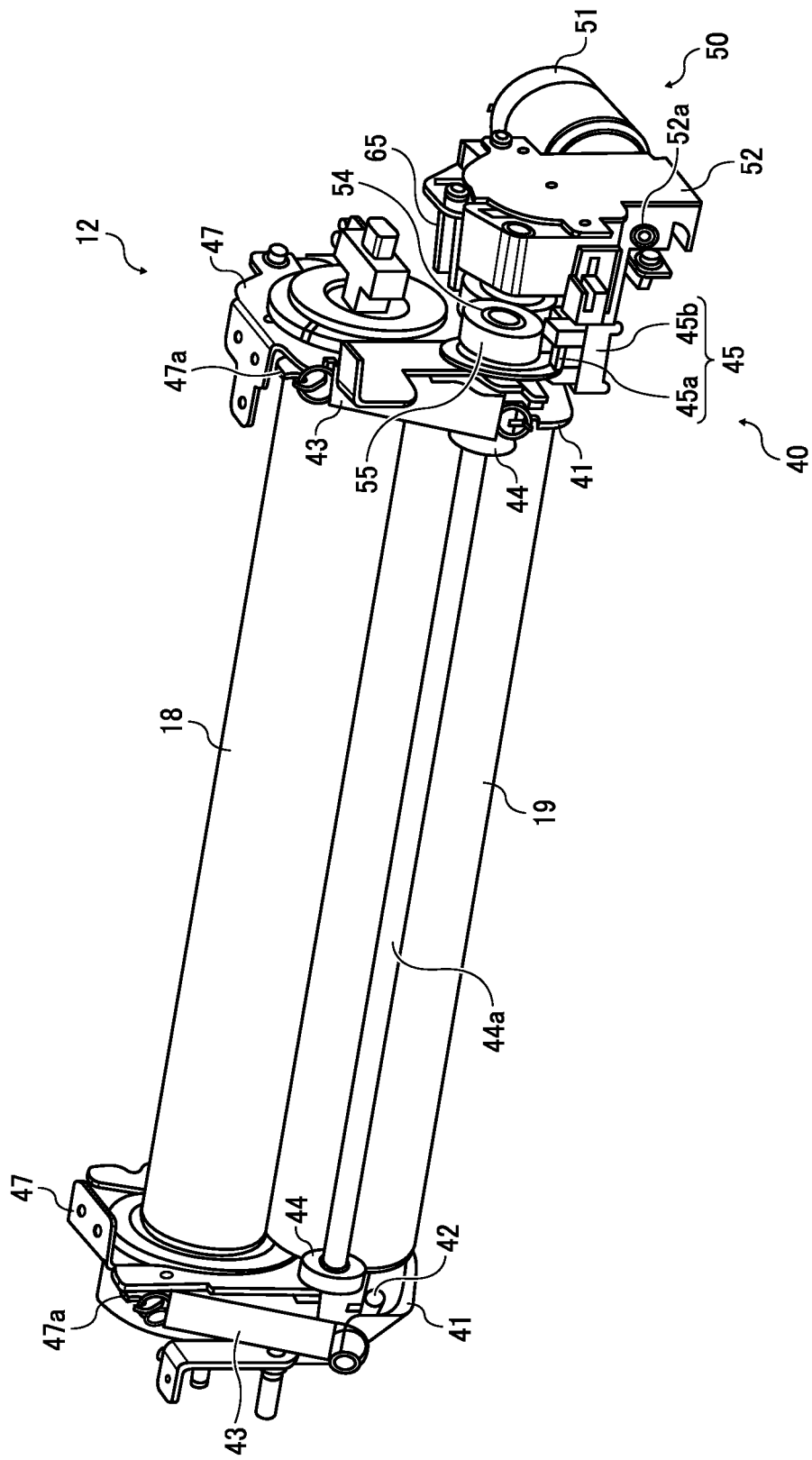
FIG. 2 is a perspective view illustrating a fixing device included in the image forming apparatus of FIG. 1.
Figure 3:
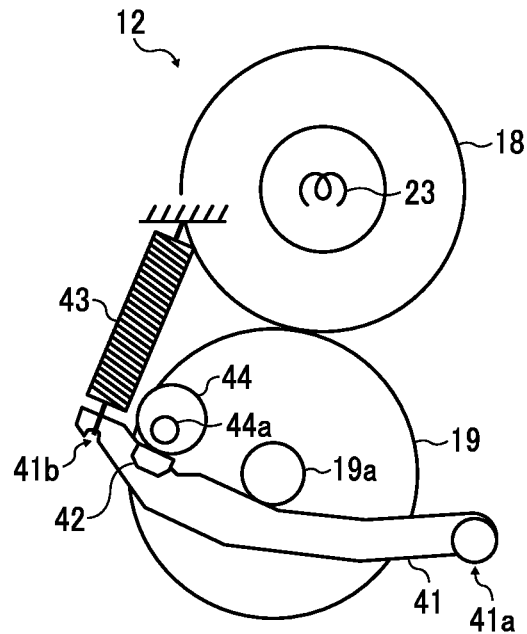
FIG. 3 is a diagram illustrating a main configuration of the fixing device.

FIG. 2 is a perspective view illustrating the fixing device 12 included in the image forming apparatus 100 of FIG. 1. FIG. 3 is a schematic cross sectional view illustrating a main part of the fixing device 12.

The fixing device 12 includes the fixing roller 18, the pressure roller 19, and a pressure adjustment mechanism 40. The fixing roller 18 functions as a heater facing body and includes the infrared heater 23 therein, so that the infrared heater 23 applies heat to the fixing roller 18. The pressure roller 19 functions as a moving body to be pressed against the fixing roller 18 and form a fixing nip region with the fixing roller 18. The pressure adjustment mechanism 40 adjusts a pressing force applied to the pressure roller 19 against the fixing roller 18.

The pressure adjustment mechanism 40 separates the pressure roller 19 from the fixing roller 18, so as to adjust to cancel the pressing force. The pressure adjustment mechanism 40 includes a pair of levers 41, a pair of springs 43, a pair of cams 44, and a drive device 50. The pair of levers 41 supports the pressure roller 19 to adjust the pressing force to approach and separate relative to the fixing roller 18. The pair of springs 43 functions as a biasing body to bias the pressure roller 19 toward the fixing roller 18 via the pair of levers 41. The pair of cams 44 moves the pressure roller 19 against a biasing force applied by the pair of springs 43 via the pair of levers 41, in a direction to separate from the fixing roller 18. The drive device 50 drives the pair of cams 44.

The fixing roller 18 is rotatably supported by a pair of side plates 47 on both sides in an axial direction thereof. The pressure roller 19 is rotatably supported by the pair of levers 41 of the pressure adjustment mechanism 40 on both sides in an axial direction thereof. As illustrated in FIG. 3, a support shaft 41a is mounted on one end of each of the pair of levers 41 and is rotatably supported by the pair of side plates 47. A spring receiver 41b is mounted on an opposed end of each of the pair of levers 41. One end of the pair of springs 43 that functions as a biasing body is attached to spring receiver 41b. As illustrated in FIG. 2, the opposed end of each of the pair of springs 43 is attached to a bearing 47a mounted on each of the pair of side plates 47. A cam bearing 42 is provided on the opposed end of each of the pair of levers 41. Each of the pair of cams 44 is in contact with the cam bearing 42.

The pair of cams 44 is mounted on a cam shaft 44a so that the pair of cams 44 rotates together with the cam shaft 44a as a single unit. A cam gear 55 is provided at a far end (the right side end in FIG. 2) of the cam shaft 44a. The cam gear 55 is mounted on the cam shaft 44a, so that the cam gear 55 that meshes with a second output gear 54 of the drive device 50 rotates together with the cam shaft 44a as a single unit.

The fixing device 12 further includes a rotation angle detection mechanism 45 to detect an angle of rotation of the pair of cams 44. A feeler 45a of the rotation angle detection mechanism 45 is disposed at the far end of the cam shaft 44a. The feeler 45a is mounted on the cam shaft 44a, so that the feeler 45a rotates together with the cam shaft 44a as a single unit. The rotation angle detection mechanism 45 further includes an optical sensor 45b that is disposed on a far side plate of the pair of side plates 47 to detect the feeler 45a. The feeler 45a is a semicircle shape. The optical sensor 45b is a photointerrupter (a transmission optical sensor).

In the process of rotation of the cam shaft 44a, as the cam shaft 44a reaches a predetermined position of angle of rotation, the feeler 45*a* is moved to a gap formed between a light emitting element and a light receiving element of the optical sensor 45*b* to block or shield an optical path formed therebetween. As the cam shaft 44*a* rotates by 180 degrees from the above-described state, the feeler 45*a* is removed from the gap between the light emitting element and the light receiving element of the optical sensor 45*b*. Accordingly, the light receiving element of the optical sensor 45*b* receives light emitted by the light emitting element. In response to receipt of light from the light emitting element, the light receiving element of the optical sensor 45*b* sends a light receiving signal to the above-described controller. The controller grasps the position of angle of rotation of a projecting portion of the pair of cams 44 that is fixed to the cam shaft 44*a*, based on the timing at which the light receiving signal from the light receiving element is lost and an amount of driving force of a drive motor 51 from the timing.

In the present embodiment, in a case in which a paper jam occurs in the fixing device 12, the pressure adjustment mechanism 40 separates the pressure roller 19 from the fixing roller 18, so as to change to the depressed state (no pressing force) between the fixing roller 18 and the pressure roller 19. Specifically, the drive motor 51 of the drive device 50 is driven to rotate the pair of cams 44. Consequently, the pair of cams 44 in the state as illustrated in FIG. 3 presses the cam bearing 42 downwardly in FIG. 3, against the biasing force applied by the pair of springs 43. According to this action, the pair of levers 41 rotates about the support shaft 41*a* in a counterclockwise direction in FIG. 3. Then, the pressure roller 19 that functions as a moving body moves in a direction away from the fixing roller 18. By so doing, the pressure roller 19 is separated from the fixing roller 18. Consequently, a sheet or sheets jammed in the fixing nip region can be removed from the fixing nip region easily.

Further, in a case in which the image forming apparatus 100 is changed from a standby state to a sleep mode or in a case in which the power source is turned off, the pressure adjustment mechanism 40 reduces a pressing force of the pressure roller 19 to the fixing roller 18, thereby preventing occurrence of creep (deformation) at the fixing nip region.

Further, in a case in which a thick paper such as an envelope is conveyed, the pressure adjustment mechanism 40 reduces the pressing force of the pressure roller 19 to the fixing roller 18. By so doing, a fixing operation can be performed without causing creases in the thick paper.

Figure 4:
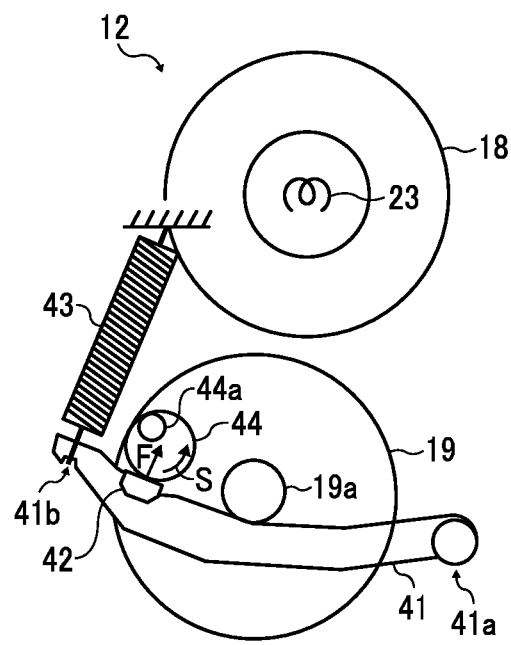
FIG. 4 is a diagram illustrating movement of a pressure roller from a depressed state to a pressed state.

FIG. 4 is a diagram illustrating movement of the pressure roller 19 from the depressed state (no pressing force) to the pressed state.

When the pressure roller 19 is in the depressed state, a top dead center of the pair of cams 44, where a distance from the center of the cam shaft 44*a* of the pair of cams 44 to the outer circumferential surface of the pair of cams 44 becomes the greatest distance, contacts the cam bearing 42. When the pair of cams 44 are rotated from this state, in a direction indicated by arrow S in FIG. 4, a biasing force F of the pair of springs 43 works to the pair of cams 44 in the direction of rotation of the pair of cams 44. There is a predetermined play such as a backlash in an engaging portion between drive transmitting members, such as a meshing portion of gears of the drive device 50. As a result, even when the pair of cams 44 is pressed to the direction of rotation by the biasing force F of the pair of springs 43, the pair of cams 44 rotates faster than a rotation speed to rotate by receiving the driving force from the drive motor 51. As the pair of cams 44 rotates by the amount of the predetermined play, the drive transmitting member on the side of the pair of cams 44 collides with the drive transmitting member on the side of the drive motor 51, and therefore sound of collision is generated. This sound of collision can be noise of the image forming apparatus 100.

In order to lower the level of sound of collision, a method of reducing the amount of the predetermined play such as a backlash of gears may be employed. However, in assembly of the fixing device 12 into the apparatus body 110 of the image forming apparatus 100, when a gear on the side of the fixing device 12 and a gear of the drive device 50 are meshed with each other, a clearance of gear is reduced, and therefore the gears cannot be meshed with each other reliably.

In order to address this inconvenience, the drive device 50 according to the present embodiment has a configuration that can achieve a reduction in such sound of collision.

Now, a detailed description is given of the drive device 50 of the pressure adjustment mechanism 40 according to the present embodiment of this disclosure, with reference to FIGS. 5, 6, 7 and 8.

Figure 5:
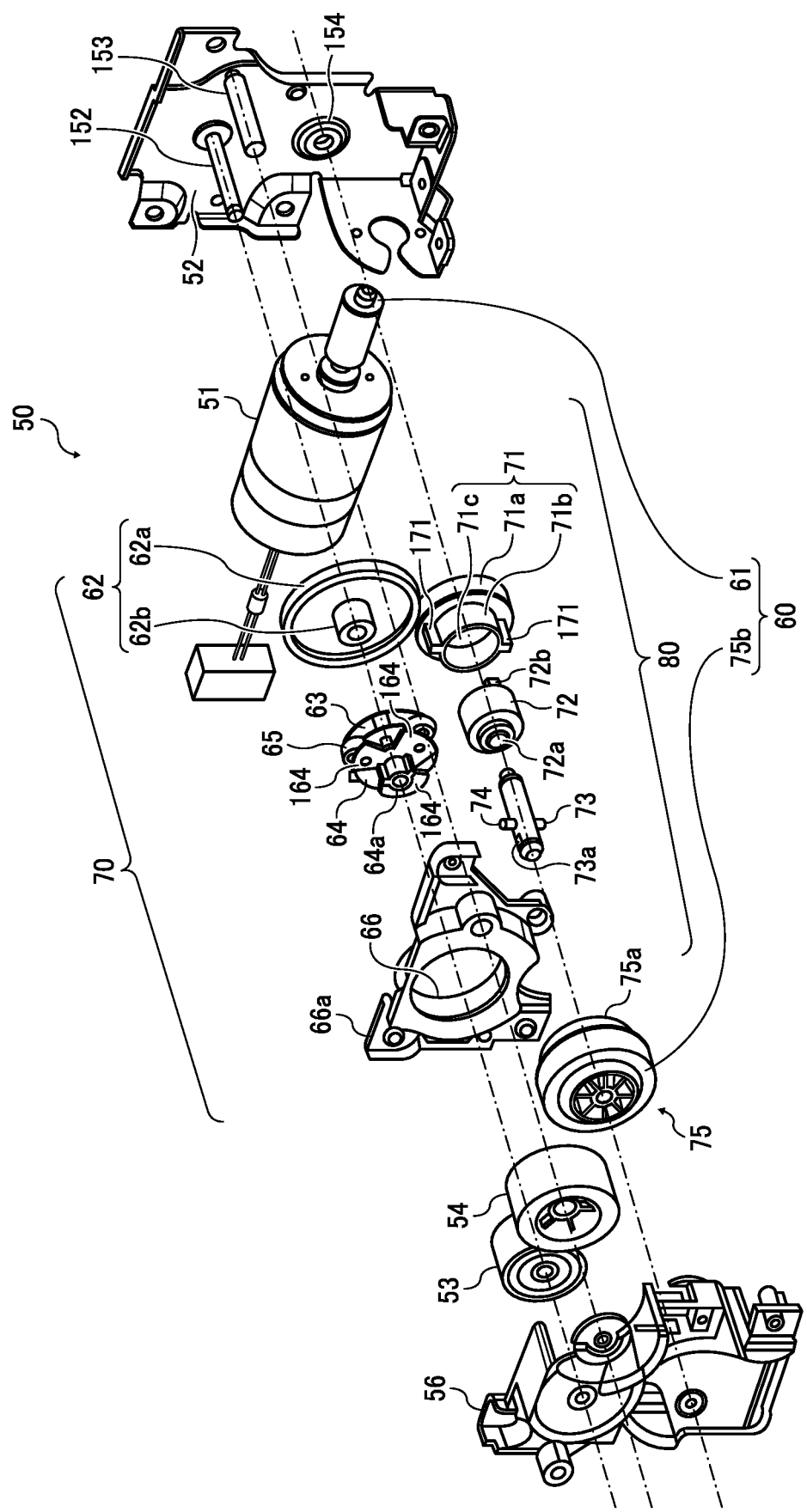
FIG. 5 is an exploded perspective view illustrating a drive device included in a pressure adjustment mechanism.
Figure 6:
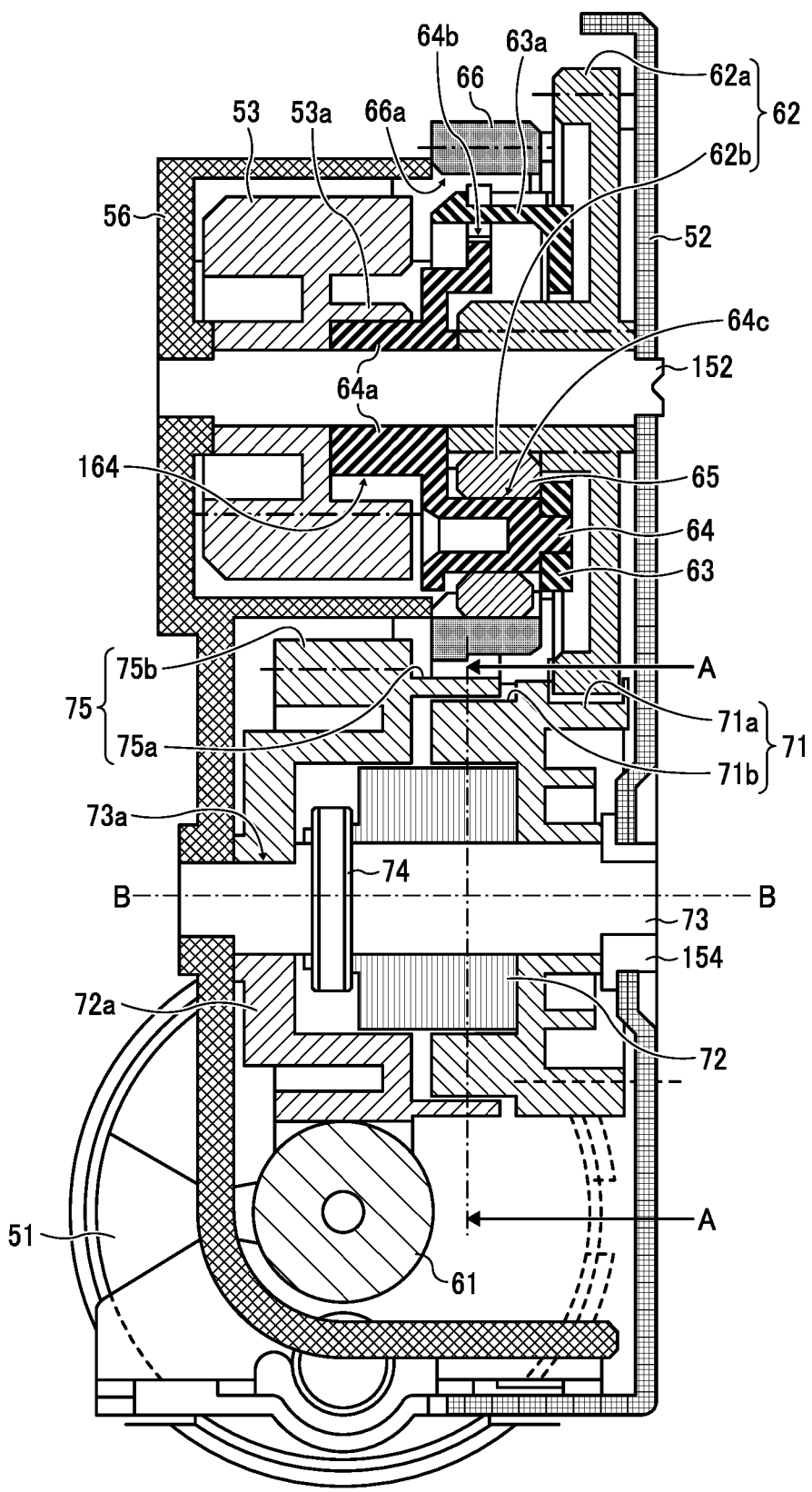
FIG. 6 is a cross sectional view illustrating the drive device, viewed parallel to an axial direction.
Figure 7:
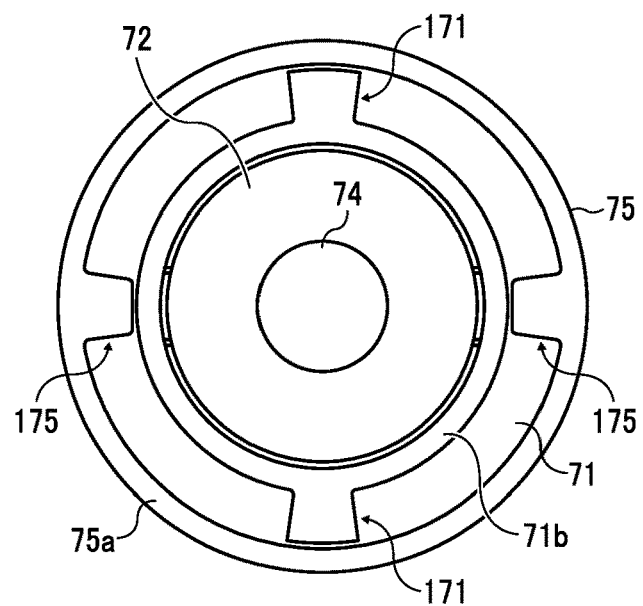
FIG. 7 is a cross sectional view illustrating the drive device of FIG. 6, along a line A-A.
Figure 8:
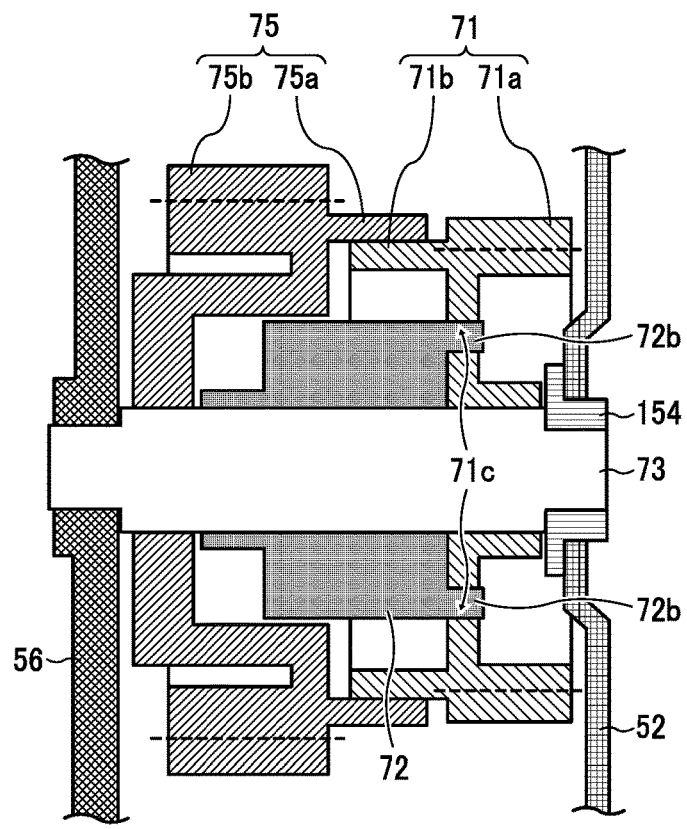
FIG. 8 is a cross sectional view illustrating the drive device of FIG. 6, along a line B-B.

FIG. 5 is an exploded perspective view illustrating the drive device 50 included in the pressure adjustment mechanism 40. FIG. 6 is a cross sectional view illustrating the drive device 50, viewed parallel to an axial direction. FIG. 7 is a cross sectional view illustrating the drive device 50 of FIG. 6, along a line A-A. FIG. 8 is a cross sectional view illustrating the drive device 50 of FIG. 6, along a line B-B.

The drive device 50 according to the present embodiment includes the drive motor 51, a worm gear 60, a planetary gear mechanism 70 and a load applying device 80. A driving force exerted by the drive motor 51 is transmitted to the worm gear 60, the load applying device 80 and the planetary gear mechanism 70 in this order. The worm gear 60, the planetary gear mechanism 70 and the load applying device 80 form a drive transmission device.

In the present embodiment, the drive motor 51 is a brush motor that is less expensive and more compact than a brushless motor. A worm 61 of the worm gear 60 is mounted on a motor shaft of the drive motor 51, so that the worm 61 is rotated together with the motor shaft of the drive motor 51 as a single unit. The worm 61 is meshed with a worm wheel 75. Helical teeth may be employed for the tooth form of a gear teeth portion 75*b* of the worm wheel 75.

The load applying device 80 includes a drive side coupling 75*a*, a driven side coupling 71*b*, a drive shaft 73, and a torque limiter 72 that functions as a load applying body.

The drive side coupling 75*a* is mounted on the worm wheel 75.

As illustrated in FIG. 7, drive side engagement projections 175 are provided on an inner circumferential surface of the drive side coupling 75*a*, at intervals of an angle of 180 degrees. The worm wheel 75 is mounted on the drive shaft 73 so that the worm wheel 75 rotates together with the drive shaft 73 as a single unit. Specifically, the drive shaft 73 has a D-shaped cut portion 73*a* as a notch having a D-shaped cross section and the worm wheel 75 has an opening having a D-shaped cross section. By fitting and inserting the opening of the worm wheel 75 into the D-shaped cut portion 73*a* of the drive shaft 73, the worm wheel 75 is mounted on the drive shaft 73 so that the worm wheel 75 rotates together with the drive shaft 73 as a single unit.

One end of the drive shaft 73 is rotatably supported by a bracket 52 via a bearing 154. The bracket 52 has an opposed face 52*a* that extends in a direction perpendicular to the rotational axis of the drive motor 51 and that is disposed facing the worm 61. An opposed end of the drive shaft 73 has a diameter that is the same size as a small diameter of the D-shaped cut portion 73*a* and is rotatably supported by a second housing 56 (see FIG. 6).

The torque limiter 72 that functions as a load applying body and a drive coupling member 71 are mounted on the drive shaft 73. Two cut portions 72a are provided at an end of the torque limiter 72 on the side of the worm wheel 75. The two cut portions 72a, each of which extending in the axial direction, are located at intervals of an angle of 180 degrees in the direction of rotation of the torque limiter 72. A parallel pin 74 is inserted into the drive shaft 73, and is fitted and inserted into the cut portions 72a of the torque limiter 72 (see FIGS. 5 and 6).

Two engagement projections 72b are provided at an opposed end of the torque limiter 72 on the side of the drive coupling member 71. The two engagement projections 72b, each of which extending in the axial direction, are located at intervals of an angle of 180 degrees in the direction of rotation of the torque limiter 72. The engagement projections 72b are fitted and inserted into an engagement opening 71c that is provided to the drive coupling member 71 on an opposing face to the torque limiter 72.

The drive coupling member 71 is rotatably supported by the drive shaft 73 and includes the driven side coupling 71b and a gear portion 71a. The driven side coupling 71b is an outer diameter for entering the driven side coupling 71b. On an outer circumferential surface of the driven side coupling 71b, two driven side engagement projections 171 are formed at intervals of an angle of 180 degrees in the direction of rotation of the driven side coupling 71b. (See FIGS. 5 and 7.) The gear portion 71a of the drive coupling member 71 is meshed with an input gear 62a of a planetary gear drive transmission member 62.

The planetary gear drive transmission member 62 is rotatably supported by a first support shaft 152 that is secured to the bracket 52 by caulking. A sun gear 62b of the planetary gear mechanism 70 is formed on the planetary gear drive transmission member 62.

The planetary gear mechanism 70 includes the sun gear 62b, three planetary gears 65, a carrier 64, an internal gear 66a, and a carrier holder 63. The three planetary gears 65 mesh with the sun gear 62b. The carrier 64 rotatably supports the three planetary gears 65. The internal gear 66a meshes with the three planetary gears 65. The carrier holder 63 is attached to the carrier 64 to hold the planetary gears 65.

The planetary gears 65 are rotatably supported by respective planetary gear support shafts 64c mounted on the carrier 64 at equal intervals in a direction of rotation of the carrier 64. The carrier holder 63 includes snap fits 63a to be attached to the carrier 64. While elastically deforming the snap fits 63a, the leading ends of the snap fits 63a are inserted into the engaging hole 64b of the carrier 64. By so doing, the carrier holder 63 is attached to the carrier 64. Accordingly, the planetary gears 65 are held by the carrier 64.

The internal gear 66a is mounted on a first housing 66. The first housing 66 is combined with the bracket 52 and the second housing 56, thereby covering the worm gear 60, the planetary gear mechanism 70, and the load applying device 80.

As illustrated in FIGS. 5 and 6, the carrier 64 includes a support target portion 64a having a cylindrical shape to be supported by the first support shaft 152. By inserting the support target portion 64a into the first support shaft 152, the carrier 64 is rotatably supported by the first support shaft 152. Three drive coupling projections 164 are provided on the outer circumferential surface of the support target portion 64a, at equal intervals having an angle of 120 degrees. The three drive coupling projections 164 are drivingly coupled to the first output gear 53 that is rotatably supported by the first support shaft 152. By contrast, the first output gear 53 has a cylindrical portion 53a on an opposing face to the carrier 64. A support target portion 64a is inserted into the cylindrical portion 53a of the first output gear 53. Three grooves into which the drive coupling projections 164 are fitted and inserted are provided on the inner circumferential surface of the cylindrical portion 53a of the first output gear 53, at equal intervals having an angle of 120 degrees. Accordingly, the driving force is transmitted from the carrier 64 to the first output gear 53.

The second output gear 54 is meshed with the first output gear 53. The second output gear 54 is rotatably supported by a second support shaft 153 that is secured to the bracket 52 by caulking. The second output gear 54 is meshed with the cam gear 55, as illustrated in FIG. 2.

As the drive motor 51 rotates, the worm gear 60 reduces the speed of transmission of the driving force. Due to the driving force having the reduced speed reduced by the worm gear 60, the drive side coupling 75a and the drive shaft 73 rotate. When each of the drive side engagement projections 175 of the drive side coupling 75a is not in contact with each of the driven side engagement projections 171, the drive torque of the drive motor 51 is added to the torque limiter 72 via the drive shaft 73. As the drive torque is added to the torque limiter 72, the torque limiter 72 is operated to interrupt the transmission of the driving force from the drive shaft 73 to the drive coupling member 71, and therefore the drive coupling member 71 is prevented from rotating. Hereinafter, the drive side engagement projections 175 and the driven side engagement projections 171 are occasionally described in a singular form. However, it is to be noted that the configurations and functions of the drive side engagement projections 175 are identical to each other whether in the singular form or in the plural form. The same conditions are applied to the driven side engagement projections 171.

When the drive side engagement projection 175 of the drive side coupling 75a contacts the driven side engagement projection 171, the driving force of the drive motor is transmitted from the drive side coupling 75a to the driven side coupling 71b, thereby rotating the drive coupling member 71. Then, the driving force is transmitted from the gear portion 71a of the drive coupling member 71 to the input gear 62a of the planetary gear drive transmission member 62. Consequently, the sun gear 62b of the planetary gear mechanism 70 rotates.

As the sun gear 62b rotates, the planetary gears 65 that mesh with the sun gear 62b revolve around the sun gear 62b while rotating. Due to revolution of the planetary gears 65 around the sun gear 62b, the carrier 64 is rotated, and the first output gear 53 that is engaged with the carrier 64 is rotated together with the carrier 64. Then, the driving force is transmitted to the second output gear 54 that is meshed with the first output gear 53, and therefore the pair of cams 44 is rotated via the cam gear 55, as illustrated in FIG. 2.

As illustrated in FIG. 4, in a case in which the pair of cams 44 rotates by receiving the biasing force F applied by the pair of springs 43, faster than the rotation speed to rotate by receiving the driving force from the drive motor 51, the cam gear 55 that is mounted on the cam shaft 44a of the pair of cams 44 rotates faster. After the cam gear 55 has rotated faster by an amount of backlash of the second output gear 54, a tooth of the cam gear 55 contacts a tooth of the second output gear 54. The second output gear 54 has a predetermined backlash in a gap with the first output gear 53, and therefore turns aside the biasing force F of the pair of springs 43 (i.e. a back torque) to rotate fast together with the cam gear 55. Therefore, a sound of collision when a tooth of the cam gear 55 contacts a tooth of the second output gear 54 seldom occurs. Then, similar to the above-described configuration, the back torque is transmitted from the second output gear 54 to the first output gear 53, the planetary gear mechanism 70 and the drive coupling member 71. Therefore, the drive coupling member 71 rotates faster than the rotation speed to rotate by receiving the driving force from the drive motor 51. Then, the back torque is inputted to the torque limiter 72 via the drive coupling member 71. The torque to operate the torque limiter 72 is set smaller than the above-described back torque. As the drive torque is inputted to the torque limiter 72, the torque limiter 72 is operated to interrupt the transmission of the driving force between the drive coupling member 71 and the drive shaft 73.

When the torque limiter 72 is operated and the drive transmission is interrupted, a predetermined rotational load is applied. For example, in a case in which the torque limiter 72 is a friction type limiter, when a torque that is applied to the torque limiter 72 is greater than a static friction force generated between a first member that is attached to the drive shaft 73 of the torque limiter 72 and a second member that is attached to the drive coupling member 71, the second member rotates relative to the first member so as to cut off the drive transmission. Accordingly, while the second member is rotating relative to the first member and the drive transmission is being blocked, a predetermined frictional force is generated between the first member and the second member, thereby generating a rotational load.

By contrast, in a case in which the torque limiter 72 is a magnetic type limiter, while the second member is rotating relative to the first member and the drive transmission is being blocked, a predetermined magnetic force is generated between the first member and the second member, thereby generating a rotational load.

As described above, when the torque limiter 72 is operated to block the drive transmission, a rotational load is generated. Therefore, when a back torque is transmitted to the drive coupling member 71, the drive coupling member 71 rotates faster than a rotation speed to rotate by receiving the driving force from the drive motor 51. Therefore, as the torque limiter 72 is operated, the rotational load is generated to the torque limiter 72, so as to brake the rotation of the drive coupling member 71. Accordingly, after the rotation of the drive coupling member 71 is reduced sufficiently, the driven side engagement projection 171 collides with the drive side engagement projection 175, and therefore occurrence of a sound of collision can be restrained.

Further, when the pair of cams 44 is rotated by the driving force applied by the drive motor 51, no torque is applied to the torque limiter 72, and therefore the torque limiter 72 is not operated. The torque limiter 72 is operated to apply the rotational load when the pair of cams 44 is rotated by the biasing force applied by the pair of springs 43. Accordingly, the load that is applied when the pair of cams 44 is rotated by the driving force applied by the drive motor 51 can be reduced, and therefore the drive motor 51 can employ a motor that is less expensive and has a relatively small output torque.

Further, in the present embodiment, the rotational load can be applied by rotating the pair of cams 44 relatively fast by applying the biasing force of the pair of springs 43, even without detecting the rotation speed of the pair of cams 44 using a detection sensor. Further, the present embodiment of this disclosure can apply a load with a simpler configuration in comparison with a configuration in which, when the pair of cams 44 is rotated faster than a regulated speed, a frictional resistance member is moved so as to press the frictional resistance member against a drive coupling member to apply a load. Accordingly, the configuration according to the present embodiment can form the load applying device 80 with a less expensive configuration, and therefore can reduce the cost and size of the image forming apparatus 100. Further, by enclosing the torque limiter 72 by the drive side coupling 75a and the driven side coupling 71b, the configuration according to the present embodiment can restrain an increase in size of the load applying device 80.

Further, no backlash is reduced for a reduction of a sound of collision. Therefore, in assembly of the fixing device 12 to the apparatus body 110 of the image forming apparatus 100, even when the gear tip of the cam gear 55 that is mounted on the fixing device 12 abuts against the gear tip of the second output gear 54, the second output gear 54 rotates to release the gear tip of the second output gear 54. By so doing, the cam gear 55 and the second output gear 54 are meshed with each other, and therefore the fixing device 12 can be assembled to the apparatus body 110 of the image forming apparatus 100 easily.

Further, the drive side engagement projection 175 and the driven side engagement projection 171 are disposed at intervals of an angle of 180 degrees in the rotation direction and the play between the drive side engagement projection 175 and the driven side engagement projection 171 is greater than the backlash of the first output gear and the backlash of the second output gear. With this configuration, the torque limiter 72 can reduce the rotation speed sufficiently, and therefore occurrence of a sound of collision can be restrained reliably.

Further, a frictional resistance member may be provided between the drive coupling member 71 and the drive shaft 73, for example, so that the frictional resistance member continuously apply a load while the pair of cams 44 is being rotated by the driving force applied by the drive motor. Even with this configuration, the driven side engagement projection 171 is rotated relatively fast by the biasing force applied by the pair of springs 43, the rotation speed at which the driven side engagement projection 171 collides with the drive side engagement projection 175 is made slower or smaller than the rotation speed with no load, and therefore occurrence of a sound of collision can be reduced.

The pair of cams 44 may perform either a one directional rotation or a bidirectional rotation. When the pair of cams 44 performs the bidirectional rotation, it is preferable to add the load applying device 80 to the configuration in which the biasing force of the pair of springs 43 does not act on switching of the rotation direction, for example, when the direction of rotation of the top dead center of the pair of cams 44 is switched at a position to contact the pair of levers 41. In a case in which the biasing force applied by the pair of springs 43 acts in the direction of rotation of the pair of cams 44 when the top dead center of the pair of cams 44 switches the rotation direction, as the drive motor 51 is rotated in the reverse direction, the driven side engagement projection 171 of the driven side coupling 71b is rotated by the biasing force applied by the pair of springs 43 to follow rotation of the drive side engagement projection 175 of the drive side coupling 75a. According to the configuration, the pair of cams 44 does not rotate faster than the rotation speed by the driving force of the drive motor 51, and therefore a sound of collision does not occur.

By contrast, when the direction of rotation of the pair of cams 44 is switched, in the configuration in which the biasing force applied by the pair of springs 43 does not act on the direction of rotation of the pair of cams 44, the pair of cams 44 is rotated by the driving force of the drive motor 51 by a certain amount, and then rotated relatively fast by the biasing force applied by the pair of springs 43. Consequently, it is likely that the above-described sound of collision occurs. Therefore, in a case in which the direction of rotation of the drive motor 51 is switched to cause the pair of cams 44 to perform the bidirectional rotation, in the configuration in which the biasing force applied by the pair of springs 43 does not act on the direction of rotation of the pair of cams 44, the load applying device 80 can prevent or restrain occurrence of a sound of collision.

As described above, when reducing the pressing force of the pressure roller 19 to the fixing roller 18, the pair of cams 44 presses the pair of levers 41 downwardly against the biasing force of the pair of springs 43. As a result, a load torque of the pair of cams 44 increases.

Further, as the opposed end of the pair of levers 41 is pressed downwardly in FIG. 3, the pair of springs 43 extends, and therefore the biasing force of the pair of springs 43 increases. Consequently, the load torque of the pair of cams 44 increases. Accordingly, as the pressing force of the pressure roller 19 to the fixing roller 18 decreases, the load torque of the pair of cams 44 increases.

Now, a description is given of a comparative fixing device having a drive transmission mechanism that transmits a driving force applied by a drive motor of a drive device to a pair of cams. When the drive transmission mechanism of the comparative fixing device includes a gear train that transmits the driving force by meshing of multiple external gears, a sufficient reduction ratio cannot be obtained. Therefore, the drive motor employs a motor having a large drive torque, so that an output torque to be output to the pair of cams becomes greater than the load torque of the pair of cams. Consequently, a pair of levers can be rotated against the biasing force of the pair of springs. However, such a drive motor having a large drive torque is large in size and expensive. As a result, the size and cost of an image forming apparatus that includes the comparative fixing device provided with the drive transmission mechanism increase.

In order to address this inconvenience, the drive device 50 according to the present embodiment has a configuration to obtain a relatively high reduction ratio using the worm gear 60 and the planetary gear mechanism 70. Thus, a relatively high reduction ratio can be obtained as described above, even when the drive motor 51 having a relatively small drive torque is used, the output torque to the pair of cams 44 can be made greater than the load torque of the pair of cams 44. Accordingly, even when the drive motor 51 employs a less expensive and compact brush motor having a relatively small torque, the drive motor 51 can rotate the pair of cams 44 against the biasing force of the springs 43 preferably, and the pressing force of the pressure roller 19 to the fixing roller 18 can be adjusted reliably.

Further, the drive device 50 according to the present embodiment includes the worm gear 60 and the planetary gear mechanism 70. According to this configuration, a relatively large reduction ratio can be obtained without using gears having a large diameter. Therefore, when compared with a configuration in which a gear train is employed to obtain a large reduction ratio, the configuration according to the present embodiment can prevent or restrain an increase in size of the image forming apparatus 100.

Further, in the present embodiment, a high reduction ratio can be obtained, and therefore the angle of rotation of the pair of cams 44 to the amount of driving force of the drive motor 51 can be relatively small. Accordingly, the angle of rotation of the pair of cams 44 can be adjusted finely, and therefore fine adjustment of the pressing force can be performed.

In the planetary gear mechanism 70 according to the present embodiment, the sun gear 62b functions as an input portion (a driving portion), the internal gear 66a functions as a fixed portion, and the carrier 64 functions as an output portion (a driven portion). By setting the sun gear 62b as the input portion, the internal gear 66a as the fixed portion, and the carrier 64 as the output portion, the planetary gear mechanism 70 according to the present embodiment can obtain a maximum reduction ratio or a greatest reduction ratio.

The configuration in which the load applying device 80 is provided to the drive device 50 is not limited to the pressure adjustment mechanism 40 that adjusts the pressing force of the pressure roller 19 to the fixing roller 18. For example, the configuration may be a contact and separation mechanism in which a transfer member contacts and separates from an image bearer or another contact and separation mechanism in which a bottom plate of a sheet feeder contacts and separates from a sheet feed roller.

Figure 9:
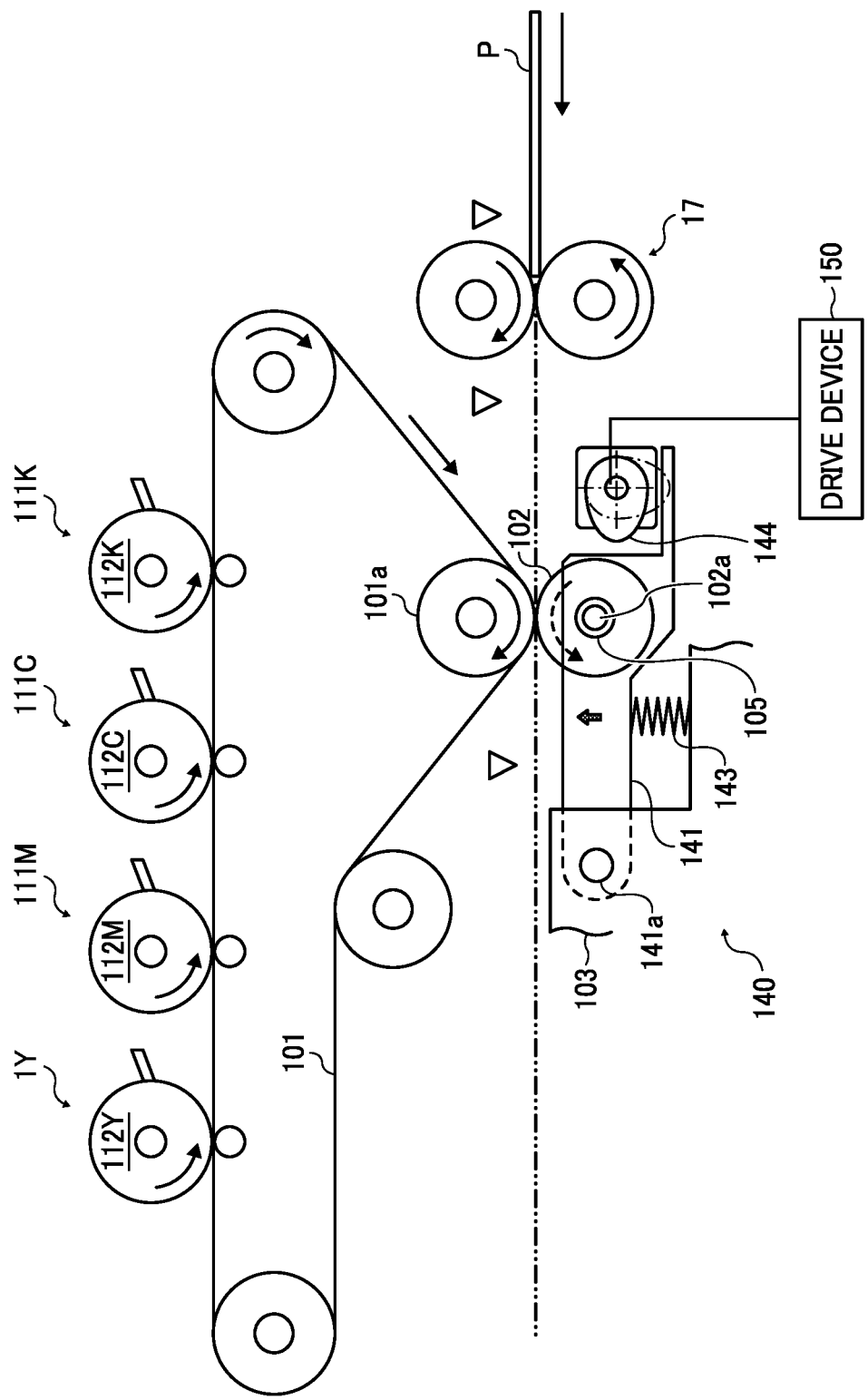
FIG. 9 is a diagram illustrating a contact and separation mechanism to contact and separate a secondary transfer roller included in a color image forming apparatus having a tandem-type intermediate transfer system, relative to an intermediate transfer belt.

FIG. 9 is a diagram illustrating a contact and separation mechanism 140 to contact and separate a secondary transfer roller included in a color image forming apparatus having a tandem-type intermediate transfer system, relative to an intermediate transfer belt that functions as an image bearer.

As illustrated in FIG. 9, the color image forming apparatus that employs a tandem-type intermediate transfer system includes four process cartridges 111Y, 111M, 111C and 111K including photoconductors 112Y, 112M, 112C and 112K, respectively.

A secondary transfer roller 102 is disposed facing a transfer roller opposing roller 101a that functions a moving member, with the intermediate transfer belt 101 interposed therebetween. The secondary transfer roller 102 contacts the transfer roller opposing roller 101a at a belt wound portion, thereby forming a secondary transfer nip region with the transfer roller opposing roller 101a. The secondary transfer roller 102 has a rotary shaft 102a and is rotatably supported by a swing arm 141 via a bearing 105. The swing arm 141 is rotatably supported by a swing shaft 141a that is mounted on a support side panel 103 so as to swing and rotate about the swing shaft 141a.

One end side of a pair of springs 143 that functions as a biasing member is fixed to the support side panel 103 and the other end side of the pair of springs 143 is fixed to a lower face of the swing arm 141. According to this configuration, a rotation force to rotate about the swing shaft 141a in a counterclockwise direction in FIG. 9 is applied to the swing arm 141. A pair of cams 144 is disposed facing the swing arm 141 at an opposite side to a support side of the swing shaft 141a of the swing arm 141. The pair of cams 144 is driven and rotated by a drive device 150. It is to be noted that the drive device 150 basically has the same configuration as the drive device 50.

In the state in FIG. 9, the top dead center of the pair of cams 144 is stopped at a rotation angle at a nine-o'clock position in the drawing, and the pair of cams 144 is not in contact with the swing arm 141. As the pair of cams 144 is rotated, from this state, by a driving force of a drive motor of the drive device 150 in the counterclockwise direction of FIG. 9, the pair of cams 144 contacts the swing arm 141 to push up the swing arm 141 against the biasing force applied by the pair of springs 143. Then, as indicated by a broken line in FIG. 9, as the top dead center of the pair of cams 144 contacts the swing arm 141, the drive motor of the drive device 150 stops. Accordingly, the secondary transfer roller 102 is located at a separating position from the intermediate transfer belt 101.

In the configuration illustrated in FIG. 9, as the pair of cams 144 is rotated from the position indicated by a broken line in a clockwise direction in FIG. 9 so as to move the secondary transfer roller 102 from the separating position to a contact position at which the secondary transfer roller 102 contacts the intermediate transfer belt 101, the biasing force applied by the pair of springs 143 acts on the pair of cams 144 in the direction of rotation of the pair of cams 144. As a result, the pair of cams 144 rotates faster than a rotation speed to rotate by receiving the driving force from the drive device 150. As a drive transmission member located on the side of the pair of cams 144 of the drive device 150 collides with the drive transmission member on the drive motor side of the drive device 150, a sound of collision is generated.

In order to address this inconvenience, the load applying device 80 as illustrated in FIGS. 5 through 8 is provided to the drive device 150 of the contact and separation mechanism 140 to contact and separate the secondary transfer roller 102 that functions as a moving member of FIG. 9 and a transfer member. According to the configuration, when the pair of cams 144 is rotated fast by the biasing force applied by the pair of springs 143, a torque limiter of the load applying device 80 is operated to brake the rotation of the pair of cams 144 to reduce the speed of rotation. Accordingly, occurrence of the sound of collision due to collision of drive transmission members can be prevented or restrained.

Figure 10:
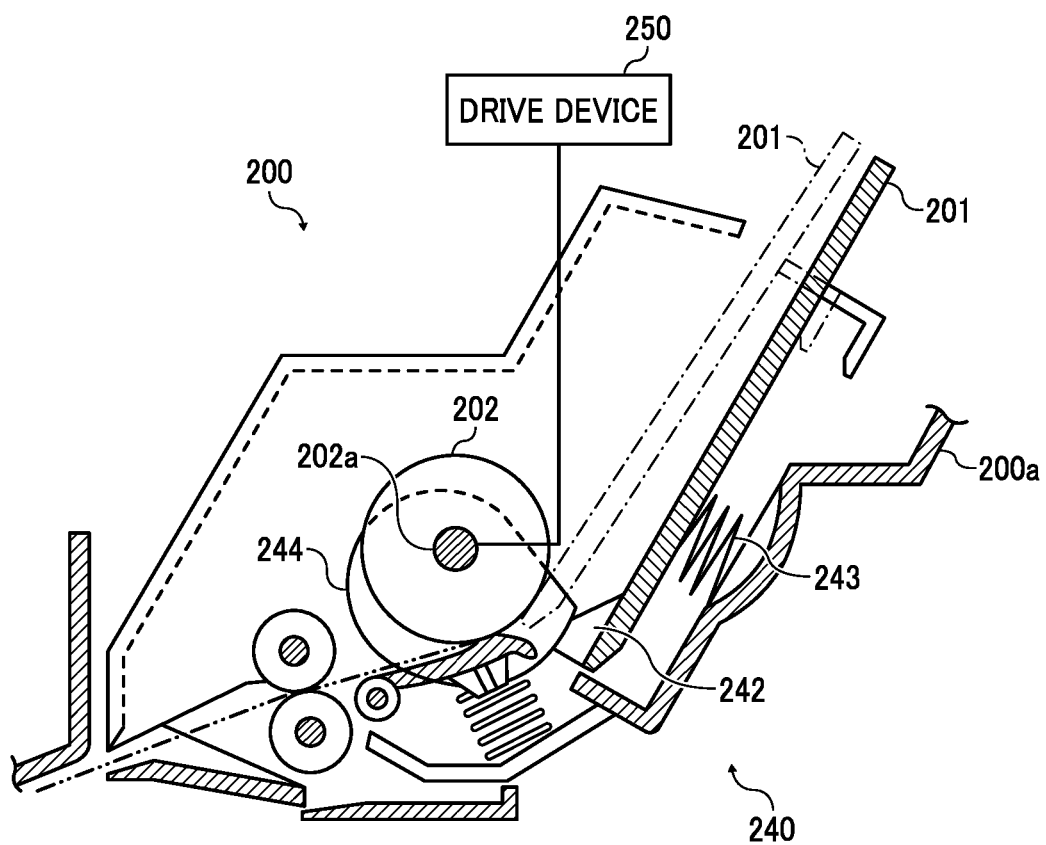
FIG. 10 is a schematic cross sectional view illustrating a contact and separation mechanism included in a sheet feeding device.

FIG. 10 is a cross sectional view illustrating a contact and separation mechanism 240 included in a sheet feeding device 200.

The sheet feeding device 200 includes a base plate 201 that functions as a sheet loader on which the sheet P is loaded, and a sheet feed roller 202. For example, a contact and separation mechanism 240 includes a pair of springs 243, a pair of cams 244 and a cam receiver 242. The base plate 201 functions as a moving member and has a sheet stacking face. The sheet feed roller 202 feeds the sheet P loaded on the base plate 201. One end of each of the pair of springs 243 is fixed to an opposite side face of the sheet stacking face of the base plate 201. The other end of each of the pair of springs 243 is fixed to a housing 200a of the sheet feeding device 200. With this configuration, the pair of springs 243 biases the base plate 201 toward the sheet feed roller 202.

The pair of cams 244 is provided on both axial sides of the sheet feed roller 202. Each of the pair of cams 244 lifts the base plate 201 so as to contact and separate a sheet loaded on the base plate 201, relative to the sheet feed roller 202. The pair of cams 244 is mounted on a shaft 202a of the sheet feed roller 202 so as to rotate together with the shaft 202a as a single unit. The pair of cams 244 contacts the cam receiver 242 that is attached to an axial end of the base plate 201.

The sheet feed roller 202 repeats rotation and stop each time the sheet feed roller 202 feeds a sheet. The sheet feed roller 202 remains stopped at a retracted position at which the top dead center of the pair of cams 244 contacts the cam receiver 242 and the base plate 201 comes to retract from the sheet feed roller 202. As the pair of cams 244 that has received the driving force from a drive device 250 starts rotating together with the sheet feed roller 202 in the clockwise direction in FIG. 10 for sheet feeding, the base plate 201 moves toward the sheet feed roller 202 by the biasing force applied by the pair of springs 243. It is to be noted that the drive device 250 basically has the same configuration as the drive device 50. Then, the base plate 201 moves to the sheet feeding position at which the sheet P loaded on the base plate 201 illustrated with a broken line in FIG. 10 contacts the sheet feed roller 202. When the sheet P loaded on the base plate 201 contacts the sheet feed roller 202, the sheet P on the base plate 201 is fed by the sheet feed roller 202. At a predetermined time before the trailing end of the sheet P in the sheet conveying direction leaves from the base plate 201, the pair of cams 244 causes the base plate 201 to descend or move downward, against the biasing force applied by the pair of springs 243. Then, as the sheet feed roller 202 rotates for one cycle and stops, the top dead center of the pair of cams 244 contacts the cam receiver 242, and therefore the base plate 201 is located at the retracted position.

In the configuration of the sheet feeding device 200, when the pair of cams 244 is rotated in the clockwise direction in FIG. 10, together with the sheet feed roller 202, so as to move the base plate 201 from the retracted position to the sheet feeding position by the biasing force applied by the pair of springs 243, the biasing force applied by the pair of springs 243 acts on the pair of cams 244 in the direction of rotation of the pair of cams 244. As a result, the pair of cams 244 and the sheet feed roller 202 rotate faster than the rotation speed to rotate by receiving the driving force from the drive device 250. Then, the drive transmission member on the side of the pair of cams 244 of the drive device 250 collides with the drive transmission member on the side of the motor of the drive device 250, which generates a sound of collision. In order to address this inconvenience, the load applying device 80 as illustrated in FIGS. 5 through 8 is provided to the of the drive device 250 to elevate the base plate 201 that functions as a moving member of FIG. 10 and as a sheet loader. According to the configuration, when the pair of cams 244 is rotated fast by the biasing force applied by the pair of springs 243, the torque limiter of the load applying device 80 is operated to brake the rotation of the pair of cams 244 to reduce the speed of rotation. Accordingly, occurrence of the sound of collision due to collision of drive transmission members can be prevented or restrained.

This configurations according to the above-descried embodiments are not limited thereto. This disclosure can achieve the following aspects effectively.

Aspect 1.

In Aspect 1, a moving device such as the pressure adjustment mechanism 40 includes a cam such as the pair of cams 44, a moving body such as pressure roller 19 configured to be moved by the cam (in the present embodiment, a mechanism to move pressure roller 19 by the pair of cams 44 via pair of levers 41), a biasing body such as the pair of springs 43 configured to apply a biasing force to bias the moving body toward the cam, a drive source such as the drive motor 51 configured to transmit the driving force to the cam, and a drive transmission device such as the worm gear 61, the planetary gear mechanism 70 and the load applying device 80 configured to transmit the driving force to the cam and including a load applying body such as the torque limiter 72 configured to apply a load to a rotation of the cam.

As described above, the sound of collision during rotation of the cam occurs as follows. That is, at the top dead center of the cam, the distance from the center of the cam shaft of the cam to the outer circumferential surface of the cam becomes the greatest distance. When the moving body is pressed against the biasing force applied by the biasing body at the top dead center of the cam, as the cam is rotated, the biasing force of the biasing body works in the direction of rotation of the cam. As a result, after the cam has rotated by the amount of the predetermined play such as the backlash of the drive transmitter such as gears by the biasing force, the drive transmitter of the drive device on the cam side collides with the drive transmitter of the drive device on the drive source side, and therefore a sound of collision is generated.

In order to address this inconvenience, the drive device in Aspect 1 is provided with the load applying body configured to apply a load to rotation of the cam. According to this configuration, by the load applied by the load applying body, the drive transmitter of the drive device on the cam side can make the speed to collide with the drive transmitter of the drive device on the drive source side slower when compared with a configuration without the load applying body. Accordingly, the amount of force when the drive transmitter of the drive device on the cam side collides with the drive transmitter of the drive device on the drive source side is reduced, and therefore the level of the sound of collision can be reduced.

Aspect 2.

In the moving device according to Aspect 1, the load applying body such as the torque limiter 72 is configured to apply the load to the rotation of the cam such as the pair of cams 44 in response to the biasing force of the biasing body such as the pair of springs 43 acting on the direction of rotation of the cam.

According to this configuration, as described in the embodiments above, when the biasing force applied by the biasing body does not work in the direction of rotation of the cam and the cam is rotated by the driving force applied by the drive source such as the drive motor 51, the load is not applied to the rotation of the cam. Accordingly, the load that is applied when the cam is rotated by the driving force applied by the drive motor can be reduced, and therefore a motor that is less expensive and has a relatively small output torque can be employed.

Aspect 3.

In the moving device according to Aspect 2, the load applying body is a torque limiter such as the torque limiter 72, the drive transmission device includes a drive side coupling such as the drive side coupling 75a configured to receive the driving force from the drive source such as the drive motor 51 and a driven side coupling such as the driven side coupling 71b configured to engage with the drive side coupling, and the torque limiter is coupled with the drive side coupling and the driven side coupling (in the present embodiment, the drive side coupling 75a and the torque limiter 72 are drivingly coupled to each other via the drive shaft 73).

According to this configuration, as described in the embodiments above, when the cam such as the pair of cams 44 is rotated by the biasing body such as the pair of springs 43 faster than the speed at which the cam is rotated by the driving force applied by the drive source such as the drive motor 51, the driven side coupling such as the driven side coupling 71b is rotated faster than the drive side coupling such as the drive side coupling 75a, and therefore the torque is applied to the torque limiter so as to start the torque limiter. As described in the embodiments above, when the torque limiter is started and the drive transmission is blocked, a rotational load such as a frictional force is generated to the torque limiter. The rotational load to the torque limiter becomes the rotational load to the cam, which brakes the rotation of the cam. As a result, the speed of the cam slows down, and the force that is to be applied when the drive transmitter of the drive device on the cam side collides with the drive transmitter of the drive device on the drive source side is reduced, and therefore the level of the sound of collision can be reduced.

By contrast, when the cam is rotated by the driving force applied by the drive source, the driving force is transmitted from the drive side coupling to the driven side coupling. Therefore, no torque is applied to the torque limiter, and therefore the torque is not started to operate. Accordingly, when the cam is rotated by the driving force applied by the drive source, the load is not applied, and therefore a motor that is less expensive and has a relatively small output torque can be employed.

Aspect 4.

In the moving device according to Aspect 3, the torque limiter such as the torque limiter 72 is mounted on a same axis as the drive side coupling such as the drive side coupling 75a and the driven side coupling such as the driven side coupling 71b. The torque limiter is enclosed in the drive side coupling and the driven side coupling.

According to this configuration, as described in the above-described embodiments, an increase in size of the image forming apparatus can be prevented.

Aspect 5.

In the moving device according to any one of Aspect 1 through Aspect 4, the moving body is a pressure roller such as the pressure roller 19 configured to press a fixing roller such as the fixing roller 18.

According to this configuration, when the pressure roller contacts to and separates from the fixing roller, occurrence of a sound of collision can be restrained.

Aspect 6.

In the moving device according to any one of Aspect 1 through Aspect 4, the moving body is a transfer body such as the secondary transfer roller 102 configured to form a transfer nip portion with an image bearer such as the intermediate transfer belt 101 while contacting the image bearer and transfer an image formed on the image bearer onto a sheet such as the sheet P.

According to this configuration, as described with reference to FIG. 9, when the transfer body contacts to and separates from the image bearer, occurrence of a sound of collision can be restrained.

Aspect 7.

In the moving device according to any one of Aspect 1 through Aspect 4, the moving body is a sheet stacking body such as the base plate 201 configured to stack a sheet such as the sheet P.

According to this configuration, as described with reference to FIG. 10, when the sheet stacking body contacts to and separates from a sheet feed roller such as the sheet feed roller 202, occurrence of a sound of collision can be restrained.

Aspect 8.

An image forming apparatus such as the image forming apparatus 100 includes a moving body such as the pressure roller 19, the secondary transfer roller 102 and the base plate 201, and the moving device such as the pressure adjustment mechanism 40 according to any one of Aspect 1 through Aspect 7, the moving device configured to move the moving body in a forward direction and a reverse direction.

According to this configuration, the level of noise of the image forming apparatus can achieve a reduction in noise emission.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A moving device comprising:
   at least one cam;
   a pressure roller configured to be moved by the at least one cam;
   at least one lever adjacent to a rotary shaft of the pressure roller and opposite a fixing roller;
   a biasing body configured to apply a biasing force to bias the pressure roller toward the at least one cam by pulling the at least one lever against the rotary shaft of the pressure roller;
   a drive source configured to apply a driving force to the at least one cam to press the at least one lever in a direction opposite the biasing force to reduce pressure between the pressure roller and the fixing roller; and
   a drive transmission device configured to transmit the driving force to the at least one cam, the drive transmission device including a load applying body configured to apply a load to a rotation of the at least one cam;
   wherein the load applying body is configured to apply the load to the rotation of the at least one cam in response to the biasing force of the biasing body acting on a direction of rotation of the at least one cam;
   wherein the load applying body is a torque limiter;
   wherein the drive transmission device includes a drive side coupling configured to receive the driving force from the drive source and a driven side coupling configured to engage with the drive side coupling;
   wherein the torque limiter is coupled with the drive side coupling and the driven side coupling;
   wherein the driving side coupling, the driven side coupling, and the torque limiter are attached to a drive shaft;
   wherein the drive side coupling and an end portion of the torque limiter on a drive side coupling side of the torque limiter are attached to the drive shaft so as to rotate integrally with the drive shaft; and
   wherein the end portion of the torque limiter on a driven side coupling side of the torque limiter is configured to rotate integrally with the driven side coupling.

2. The moving device according to claim 1,
   wherein the torque limiter is mounted on a same axis as the drive side coupling and the driven side coupling, and
   wherein the torque limiter is enclosed in the drive side coupling and the driven side coupling.

3. The moving device according to claim 1,
   wherein the pressure roller is configured to stack a sheet.

4. An image forming apparatus comprising:
   the moving device according to claim 1, wherein the biasing body and the at least one cam are configured to move the pressure roller in a forward direction against the fixing roller and a reverse direction that is separated from the fixing roller.

5. The moving device according to claim 1, wherein,
   the at least one cam is configured to rotate between,
      a first position in which the at least one lever is in a pressed state, and
      a second position in which the at least one lever is in a depressed state in which the at least one cam presses the at least one lever in the direction opposite the biasing force to decrease the pressure between the pressure roller and the fixing roller relative to the pressed state.

6. The moving device according to claim 5, wherein,
   the biasing body comprises at least one spring,
   the at least one lever is configured to, in the depressed state, extend the at least one spring relative to the pressed state, wherein extending the at least one spring increases the biasing force relative to the pressed state.

7. The moving device according to claim 1,
   wherein the drive side coupling has an engaging protrusion,
   wherein the driven side coupling has an engagement target protrusion, and
   wherein the engaging protrusion and the engagement target protrusion are out of phase from each other.

8. The moving device according to claim 7, wherein the torque limiter operates in a state in which the engaging protrusion is not in contact with the engagement target protrusion.

* * * * *